United States Patent Office 3,453,908
Patented July 8, 1969

3,453,908
HYDRAULIC CONTROL SYSTEM FOR AUTOMATIC TRANSMISSION
Tetsuya Iijima, Tokyo, Japan, assignor to Nissan Jidosha Kabushiki Kaisha, Kanagawa-ku, Yokohama, Japan
Filed Jan. 25, 1968, Ser. No. 700,548
Claims priority, application Japan, Feb. 9, 1967, 42/7,955; Feb. 14, 1967, 42/8,976
Int. Cl. B60k *19/00;* F16h *5/48, 5/40*
U.S. Cl. 74—867     2 Claims

ABSTRACT OF THE DISCLOSURE

A hydraulic control system for multiple speed ratio power transmission mechanism comprising a line pressure cut down valve to regulate line pressure to accommodate necessary capacity of friction elements, so that the line pressure increases as the engine torque increases, and is reduced stepwise as the vehicle speed increases to a predetermined value or a valve determined by the engine torque.

---

Figure 1:
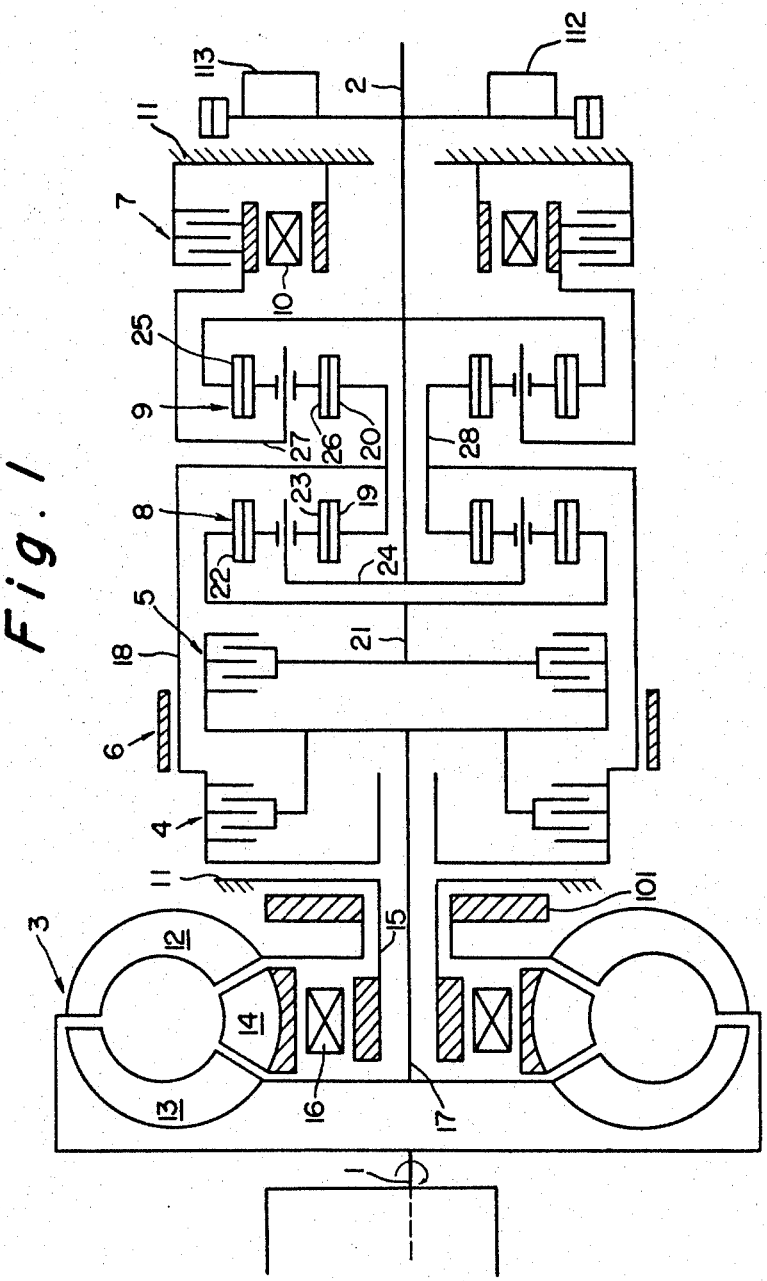

The present invention relates generally to control system for multiple speed ratio power transmission mechanisms, and more particularly to a hydraulic control system for automatic transmission that is adapted to be used in the drive line of a vehicle for transferring torque from the vehicle engine to the vehicle driving device giving selecting automatic or manual selection of the multiple speed-ratios.

In an automatic transmission mechanism having an input and an output shafts, a hydraulic torque converter and a planetary gear mechanism disposed between the shafts, and hydraulically operating friction clutches and brakes and providing a plurality of gear ratios by combining engagement of the clutch(es) and/or brake(s), transmission torque of the friction clutch and braking torque of the friction brake change in relation to engine torque and speed of the vehicle.

The necessary transmission torque capacity of the friction elements is larger or smaller as the engine torque to be transmitted or the reaction torque to be braked is large or small respectively. Also, a larger capacity is necessary when the vehicle is starting or low speed compared to higher speed of the vehicle. In the specification and claims, "friction clutch" means engageable and disengageable means to connect or disconnect torque transmission between rotatable members, "friction brake" means engageable and disengageable means to clamp or let free a rotatable member to a stationary portion of the transmission mechanism, and "friction element" includes such friction clutch and/or friction brake.

When the torque capacity of such friction element is too small, a slipping between the members to be clamped each other will be too much and result in inaccurate operation or runaway of the engine. When the torque capacity of friction element is too large, the clutch or brake will engage instantaneous and result in severe shock. As the torque capacity depends on hydraulic pressure actuating hydraulic piston operating the friction element, smooth shift operation can be obtained by controlling the hydraulic pressure so as to minimize the difference between the torque capacity of the friction element and the necessary torque to be transmitted or braked.

Accordingly, a primary object of the present invention is to provide a control system of actuating hydraulic pressure for friction elements to attain smooth shifting of an automatic transmission for vehicle.

Another object of the present invention is to provide the above mentioned hydraulic control system having improved valve means to increase hydraulic pressure relating to increase of driving torque of the engine, and also to decrease the hydraulic pressure stepwise as speed of the vehicle is increased to a predetermined value.

Still another object of the present invention is to provide the hydraulic control system having improved valve means to increase hydraulic pressure as the engine torque increases, and to reduce the hydraulic pressure stepwise as the vehicle speed is increased to a value determined by the engine torque.

Figures 2, 11:
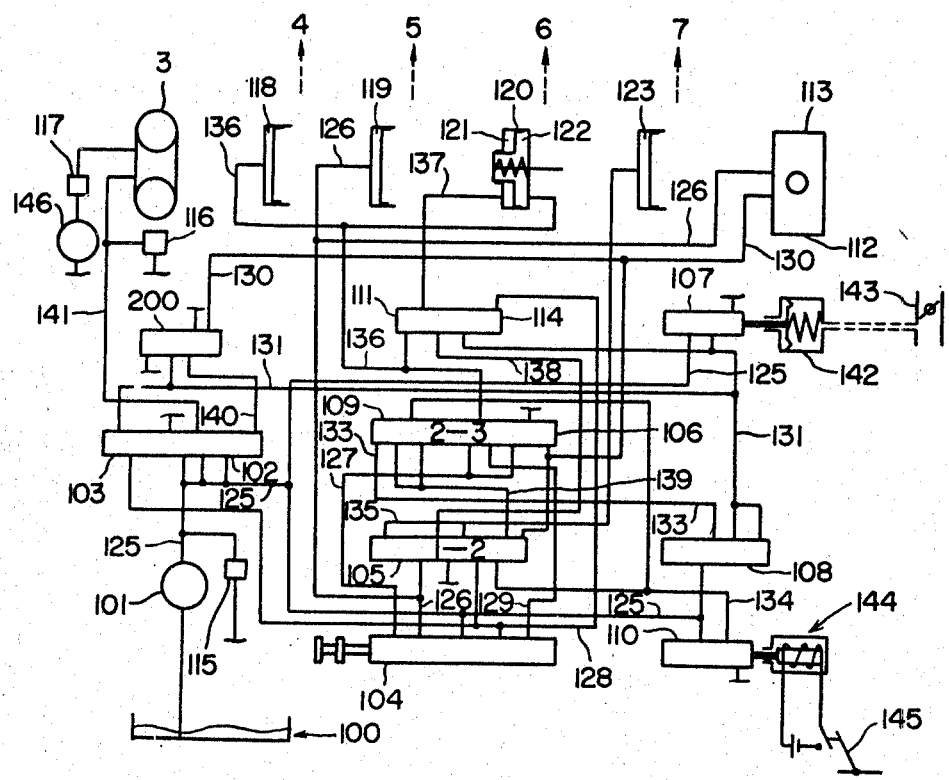
Figure 3:
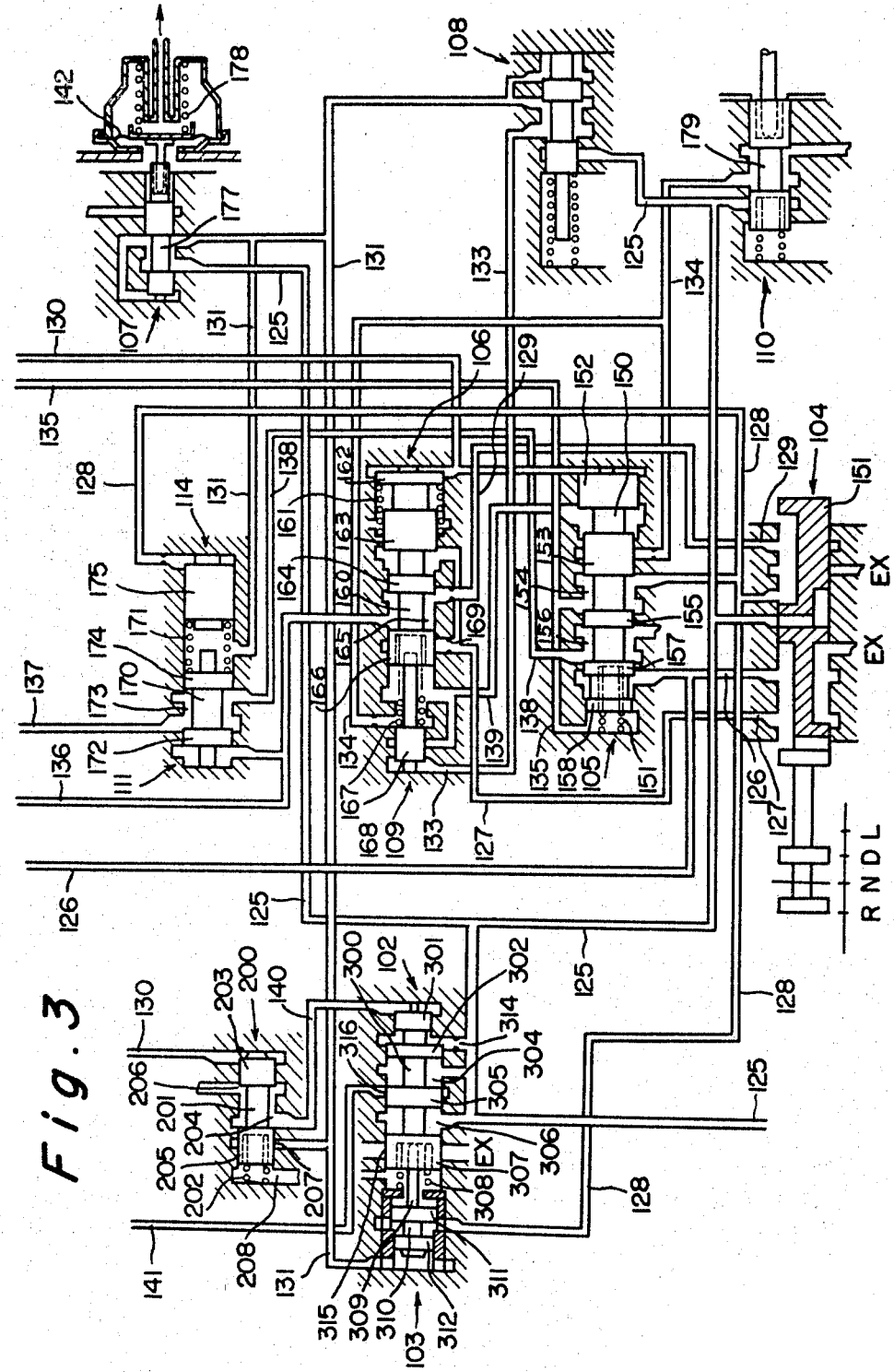
Figure 4:
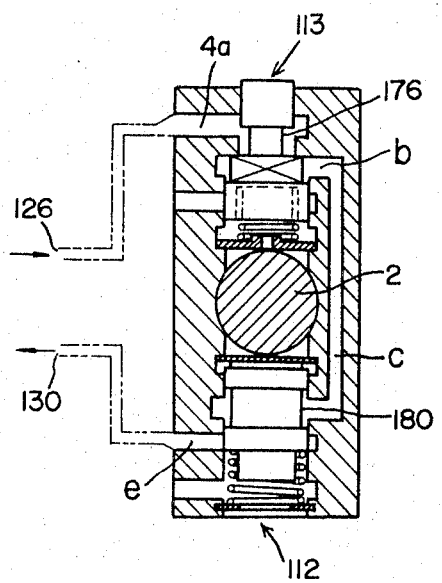
Figure 5:
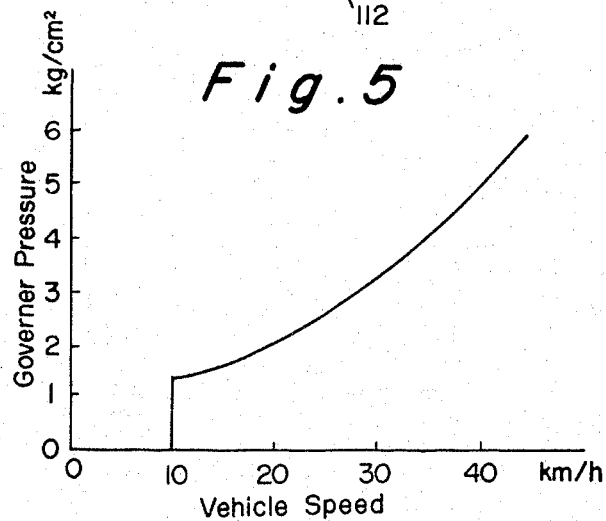
Figure 6:
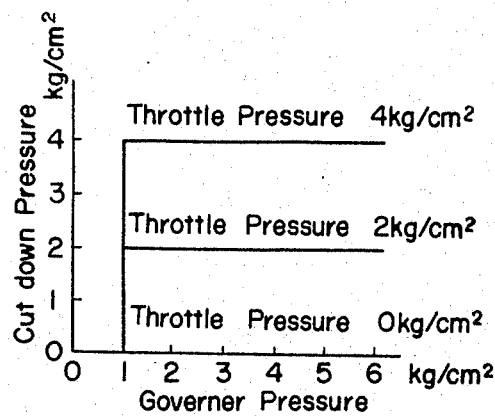
Figure 7:
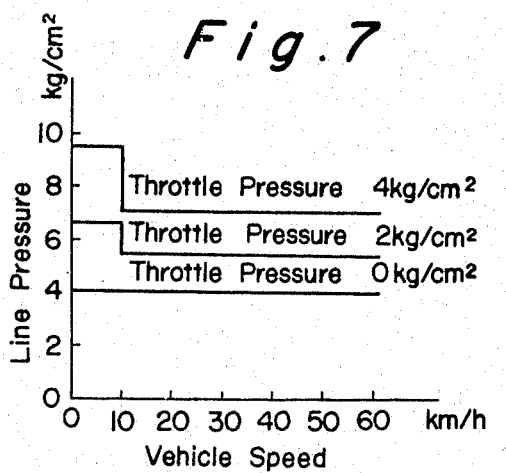
Figure 8:
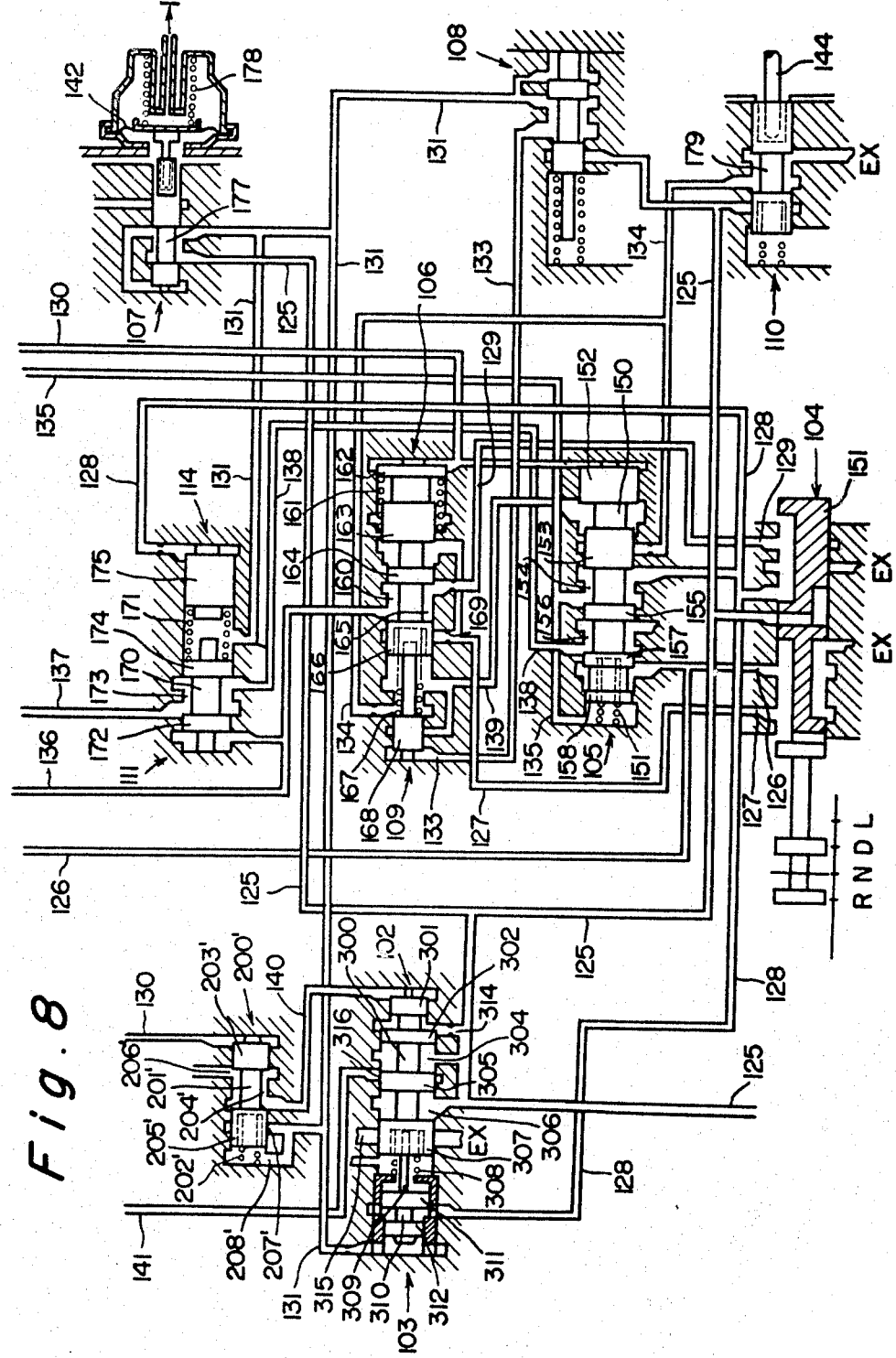
Figure 9:
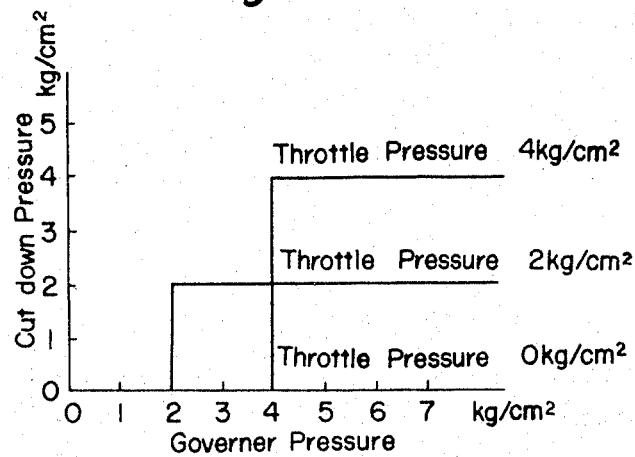
Figure 10:
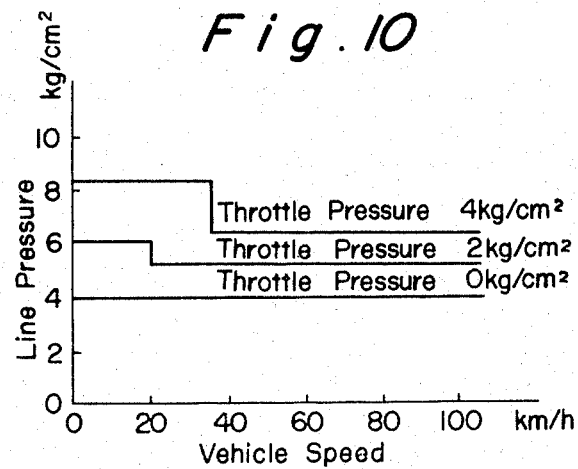

Further and more specific objects, features and advantages of the present invention and the manner in which the invention is carried into practice are made apparent in the following detailed description of preferred embodiments, by way of example, wherein reference is made to the accompanying drawings, in which:

FIG. 1 shows a diagrammatic illustration of a power transmision mechanism of automatic transmission of a vehicle, FIG. 2 shows a hydraulic control system according to the present invention controlling the transmission shown in FIG. 1, FIG. 3 shows detailed diagram of the hydraulic control system shown in FIG. 2, FIG. 4 shows diagrammatic sectional view of a governor valve shown in FIG. 2, FIG. 5 shows a characteristic governor pressure curve, FIG. 6 shows a characteristic diagram of relations between governor pressure, throttle pressure and cut down pressure obtained by the cut down valve according to the invention, FIG. 7 shows a characteristic diagram of line pressure in relation to vehicle speed and throttle pressure, FIG. 8 shows modified detailed diagram of the hydraulic control system according to a second embodiment of the present invention, FIG. 9 shows a modified characteristic diagram of cut down pressure obtained by the cut down valve shown in FIG. 8, FIG. 10 shows a modified characteristic diagram of line pressure obtained by the cut down valve shown in FIG. 8, and FIG. 11 shows a third embodiment of the cut down valve according to the invention.

FIG. 1 shows in a schematic form a power transmission mechanism providing a three element torque converter unit and two planetary gear units. While this is used as an example to describe the invention, it will be understood that the invention has application to any apparatus comprising a torque converter or hydraulic coupling unit and a plurality of planetary gear units and providing hydraulic control system to effect automatic shifting between speed ratios.

The transmission mechanism shown comprises an input shaft 1, an output shaft 2, a torque converter assembly 3, two friction clutches 4 and 5, two friction brakes 6 and 7, each clutch and brake being actuated by hydraulic pressure, two planetary gear units 8 and 9, a one way brake 10, and a casing 11 accommodating the planetary gear units and the friction elements. The torque converter 3 comprises an impeller 12 connected to the input shaft 1, a turbine 13 which is driven by the impeller 12, and a stator 14 which is connected to a stationary shaft 15 through a one way clutch 16, and is filled with working fluid transmitting the driving torque. The power transmitted through the working fluid and the impeller 12 by the engine drive shaft 1 to the turbine 13 is transmitted through an intermediate shaft 17 to the friction clutches 4 and 5.

The friction clutch 4 is connected through a drum 18 to sun gears 19 and 20 of the planetary gear units 8 and 9 respectively. The friction clutch 5 is connected through an intermediate shaft 21 to a ring gear 22 of the planetary gear unit 8. A plurality of planet gears 23 meshing with the ring gear 22 and the sun gear 19 are supported by a carrier 24 secured to the output shaft 2 which is secured to a ring gear 25 of the rear planetary gear unit 9. A plurality of planet gears 26 meshing with the ring gear 25 and the sun gear 20 are supported by a carrier 27 which is connected to the friction brake 7 and the one-way clutch 10. The friction brake 7 clamps by engagement thereof the planet gear carrier 27, and the one way clutch 10 permits the carrier 27 only to the direction of rotation of the input shaft 1 indicated by an arrow. The friction brake 6 clamps by tightening to the drum 18 the sun gears 19 and 20 through a hollow transmission shaft 28.

The transmission mechanism shown in FIG. 1 provides three forward and one reverse speed ratios by suitable engagement of the friction elements as shown in Table 1.

TABLE 1

| | Gear ratio | Friction elements engaged | | | | |
|---|---|---|---|---|---|---|
| | | Clutch 4 | Clutch 5 | Brake 6 | Brake 7 | One-way clutch 10 |
| Speeds: | | | | | | |
| 1st | 2.45 | — | o | — | — | o |
| 2nd | 1.45 | — | o | o | — | — |
| 3rd | 1.00 | o | o | — | — | — |
| 1st (manual low) | 2.45 | — | o | — | o | o |
| Reverse | 2.18 | o | — | — | o | — |

In the Table 1: "o" shows engagement of the friction element or locking of the one way clutch; and "—" shows disengagement or free relative rotation thereof.

In FIG. 1 no hydraulic control system actuating the friction elements is shown, however a few of the functional members are shown; these are an engine driven fluid pump 101 and a governor valve assembly 112 and 113 which is connected to the output shaft 2.

FIG. 2 shows a hydraulic circuit diagram of a hydraulic control system which is adapted to control the power transmission mechanism shown in FIG. 1 according to one preferred embodiment of the present invention. The hydraulic control system comprises a fluid sump 100, a fluid pump 101, a line pressure regulator valve 102, a pressure booster valve 103, a manual shift valve 104, a 1–2 shift valve 105, a 2–3 shift valve 106, a throttle valve 107, a throttle booster valve 108, a throttle modulator valve 109, a kick valve 110, a 2–3 timing valve 111, a primary governor valve 112, a secondary governor valve 113, a manual low valve 114, a line pressure relief valve 115, a torque converter pressure relief valve 116, a torque converter check valve 117 and a line pressure cut down valve 200 to effect desired automatic shifting between the above mentioned speed ratios by introducing predetermined line pressure to the friction elements. The control system further comprises a hydraulic servo 118 to engage the friction clutch 4 by introducing hydraulic pressure to the servo 118, a hydraulic servo 119 to operate the friction clutch 5, a hydraulic servo 120 to operate the friction brake 6, an engage side brake chamber 121 and a release side brake chamber 122 of the hydraulic servo 120, a hydraulic servo 123 to operate the friction brake 7, and hydraulic passage connecting between aforementioned components such as valves and hydraulic servos to deliver operating or controlling hydraulic pressure as will be described in more detail hereinafter.

FIG. 3 shows detailed illustration of main portions of hydraulic circuit shown in FIG. 2. A general operation of the hydraulic control system will be described referring to FIGS. 2 and 3.

As a single hydraulic pressure source, operating fluid of the hydraulic control system, working fluid of the torque converter, and lubricating liquid of the transmission mechanism are delivered by the fluid pump 101 which is driven by the engine and is adapted to draw fluid from the sump 100 and to supply fluid under pressure to a main line pressure passage 125. The fluid pressure in the passage 125 is main source of the hydraulic circuit and is mentioned as line pressure. The line pressure is regulated by the line pressure regulator valve 102 as will be described in more detail hereinafter. The relief valve 115 relieves fluid when the line pressure is increased beyond a predetermined value. Fluid is supplied to the torque converter 3 through the regulating valve 102 and a passage 141. The torque converter relief valve 116 maintains the fluid pressure in the passage 141 under a predetermined value, and the torque converter check valve 117 maintains fluid pressure in the torque converter 3. Fluid passed through the check valve 117 is delivered through an oil cooler 146 to portions to be lubricated.

The manual shift valve 104 comprises a valve spool 151 which is operable by the operator through a conventional mechanical linkage to introduce line pressure in the passage 125 to passages 126, 127, 128 or 129 as shown in Table 2 as mark "o," according to the various shift positions R, N, D, and L respectively.

TABLE 2

| | R | N | D | L |
|---|---|---|---|---|
| Shift position passages: | | | | |
| 126 | — | — | o | o |
| 127 | — | — | o | — |
| 128 | o | — | — | o |
| 129 | o | — | — | — |

The operation of the power transmission mechanism shown in FIG. 1 according to the shift positions R, N, D, and L will be: reverse drive by position R, neutral by position N, automatic three speeds forward drive by position D, 1st or 2nd, and shift down only from 2nd to 1st by position L.

The manual shift valve spool 151 is indicated in the neutral or N position in FIG. 3, thus prevents all operating passages from line pressure passage 125.

When the manual shift valve spool 151 is shifted to automatic three speeds forward drive position D, the passages 126 and 127 communicate to the line pressure passage 125. The line pressure supplied through the passage 126 actuate the hydraulic servo 119 to engage the friction clutch 5 all while the three speeds forward drive. Further, the passage 126 communicate to the secondary governor valve 113 and to the 1–2 shift valve 105. The line pressure through the passage 127 is supplied to the 2–3 shift valve 106.

The 1–2 shift valve 105 comprises a valve spool 150 which is biased by a spring 151 to keep the valve spool 150 to the rightward position as shown in FIG. 3 at 1st speed ratio. The spool 150 shifts leftward by governor pressure through a passage 130 acting to the right end surface of the spool 150 at the 2nd and 3rd speed ratio, thus delivers the line pressure through the passage 126 to a groove 156 between lands 155 and 157 of the spool 150 and to a passage 138. The passage 138 is communicated to the 2–3 timing valve 111, and when a valve spool 170 thereof is positioned as shown the passages 138 and 137 is communicated through a groove 173 between lands 172 and 174 of the valve spool 170, thus establish the line pressure in the engage side brake chamber 121 of the hydraulic servo 120 effecting engagement of the friction brake 6 so that the vehicle which have been operating by 1st speed ratio by engaging the friction clutch 5 and the one way brake 10 will be shifted to the 2nd range by engaging the friction clutch 5 and the friction brake 6 as shown in Table 1. The automatic shifting between the speed ratios is effected by the governor pressure, i.e. the pressure representing the output shaft speed or the vehicle speed and increasing as a function to the vehicle speed.

The 2–3 shift valve 106 comprises a valve spool 160 which is biased to rightward position as shown in FIG. 3, by a spring 161 to block the passage 127 as shown at the 1st and 2nd speed ratio. When the governor pressure acting to the right end surface of the spool 160 increases to a predetermined value, the spool 160 shifts leftward against the bias of the spring 161, so that the passage 127 registers the groove 165 between lands 164 and 166 to supply line pressure to a passage 136. Thus the line pressure is supplied to the release side brake chamber 122 of the hydraulic servo 120 to effect disengagement of the friction brake 6, and also to the hydraulic servo 118 to effect engagement of the friction clutch 4, so that the power transmission mechanism shown in FIG. 1 is driven by the 3rd speed ratio or direct coupling.

Further the line pressure through the passage 136 also is applied to the left end surface of the valve spool 170 of the 2–3 timing valve 111 to shift the spool 170 rightward so that the passage 138 is blocked and the passage 137 in turn communicates to the passage 136 also to supply the same line pressure to the engage side brake chamber 121 of the hydraulic servo 120. The effective area of the chamber 122 is greater than the effective area of the chamber 121, thus when both chambers 121 and 122 are pressurized simultaneously, the brake servo will assume a release position, so that the release timing of the brake 6 is adjusted by the 2–3 timing valve 111 to effect smooth operation of the automatic 2–3 speed shifting.

When the manual shift valve 104 is position L, passages 126 and 128 are communicated to line pressure, as shown in Table 2. The line pressure through passage 126 engages friction clutch 5 and delivers governor pressure same as position D. The passage 128 is communicated to the 1–2 shift valve 105, the manual low valve 114 and the line pressure booster valve 103. The line pressure acting to the right end surface of spool 175 of the manual low valve 114 shifts the spool 175 leftward to keep the spool 170 of the 2–3 timing valve to the illustrated position, so that when the vehicle speed is high enough to shift the valve spool 150 of the 1–2 shift valve 105 to the left position by the governor pressure through passage 130, the line pressure through passage 138 is supplied to the engage side 121 of the hydraulic servo 120 to effect engagement of the friction brake 6. Whether the vehicle has been operating by 3rd speed ratio, the shifting to position L effects exhaust of the passage 127, so that the clutch 4 is disengaged and also the line pressure in the release side chamber 122 of the hydraulic servo 120 is exhausted. Thus, the transmission mechanism shifts down to 2nd speed ratio.

As the vehicle speed decreases to effect rightward shift of the spool 150 of the 1–2 shift valve 105 to the illustrated position, the communication between passages 126 and 138 is blocked and line pressure through the passage 128 is passed through groove 154 between lands 153 and 155 of the spool 150 of the 1–2 shift valve 105 to operate the hydraulic servo 123 engaging the friction brake 7. As the passage 138 is exhausted to effect disengagement of the friction brake 6 and the friction brake 7 is engaged, the vehicle operates by 1st speed ratio. As the brake 7 secures the carrier 27 of the planet gears 25 as previously described to both direction, so called engine brake is effective which is unable by position D engaging only the one-way brake 10 as mentioned before.

The passage 135 is communicated to the left end surface of the spool 150 of the 1–2 shift valve 105 to maintain the spool 150 to the illustrated rightward position, so that the spool will not shift leftward whether the vehicle speed is increased. The passage 128 leading to the line pressure booster valve 103 increase line pressure as described hereinafter.

When the manual shift valve 104 is shifted to position R, line pressure is supplied through passages 128 and 129. As passage 126 is exhausted, no governor pressure is present so that the 1–2 shift valve 105 and the 2–3 shift valve 106 are kept to rightward position. The line pressure through passage 128 is supplied through groove 154 between lands 153 and 155 of the 1–2 shift valve 105, and passage 135 to the hydraulic servo 123 to engage the friction brake 7. Also, the line pressure through passage 129 is supplied through groove 165 between lands 164 and 166 of the 2–3 shift valve 106 and passage 136 to the hydraulic servo 118 to engage the friction clutch 4. The engagement of the clutch 4 and the brake 7 effect reverse rotation of the output shaft 2 of the transmission mechanism as shown in Table 1.

FIG. 4 shows the governor valves 112 and 113 which are secured to the transmission output shaft 2 to produce hydraulic pressure representing vehicle speed. The governor valves may be in any construction representing the vehicle speeds as a suitable function, but, in the illustrated embodiment, the governor valve 113 is constructed as a pressure regulator valve and hydraulic pressure determined by centrifugal force of the spool 176 and the spring force biasing the spool is delivered to passage $b$ when line pressure through passage 126 acts upon the surface of the spool 176 through passage $a$. Thus the modulated hydraulic pressure increases as a function of the vehicle speed. The governor valve 112 is constructed as a change-over valve and prevents output of the hydraulic pressure below a predetermined value. Thus the fluid delivered as governor pressure from passage 130 through passages $b$, $c$, $d$ and $e$. One form of the governor pressure characteristic curve is shown in FIG. 5 relative to the vehicle speed.

The governor pressure through passage 130 is delivered to the right end surface of the land 152 of the 1–2 shift valve 105 and the right end surface of the land 162 of the 2–3 shift valve to effect leftward shift of the valve spools when the vehicle speeds beyond respective predetermined values, so that automatic shifting between the speed ratios can be attained as previously described. Also the passage 130 is communicated to the right end surface of spool 201 of the line pressure cut-down valve 200 as will be explained in more detail hereinafter.

The throttle valve 107 produces hydraulic pressure representing the engine torque. One embodiment shown in FIG. 3, the engine torque is detected by negative pressure in the engine intake manifold 143 and the negative pressure is introduced to a vacuum diaphragm 142. Hydraulic pressure representing the engine torque is produced by equilibrium between the negative pressure acting to the vacuum diaphragm and hydraulic force acting to the left end surface of the spool 177 from the biasing force of the spring 178. As the line pressure is supplied through passage 125, the passage 131 always supplies the throttle pressure which increases as the engine torque increases. The throttle pressure through passage 131 is supplied to the throttle booster valve 108, a portion between the 2–3 timing valve 111 and the manual low valve 114, the line pressure booster valve 103, and the line pressure cut-down valve 200.

The throttle booster valve 108 increases throttle pressure through passage 131 by combining line pressure through passage 125, so that the boosted throttle pressure is supplied through passage 133 to the left end surface of the throttle modulating valve 109 to effect delay of shifting of the 2–3 shift valve 106 when the engine torque is relatively high. Also, when the 2–3 shift valve remains to the illustrated right end position, the pressure itself is reduced by the throttle modulating valve 109 and the modulated pressure is supplied through passage 139 to the 1–2 shift valve 105 between lands 152 and 153.

Land 152 is larger than the land 153, so that the hydraulic pressure through the passage 139 will establish a pressure force to prevent leftward shift of the 1–2 shift valve 105, consequently, automatic shifting from 1st to 2nd speed ratio is delayed when the engine torque is relatively high.

The kick down valve 110 is communicated by line pressure through passage 125 registering to a land of the valve spool 179. When a switch 145 secured to accelerator pedal 145 is closed to actuate a solenoid 144, the spool 179 shifts leftward to uncover passage 125 to passage 134. Line pressure through the passage 134 is applied to left end surface of the 2–3 shift valve 106 and the groove between the area difference lands 152 and 153 of the 1–2 shift valve 105 when the spool 150 is in leftward position, so that in both cases the shift valve spools will move rightward according to the biasing governor pressure thus downshift from 3rd to 2nd or from 2nd to 1st speed ratio is attained.

In the illustrated embodiment, the line pressure regulator valve 102 and the line pressure booster valve 103 comprise valve spool 300 and 310 respectively, but the valves may be constructed integral as desired. In the specification line pressure regulator valve assembly includes the regulator valve 102 and the booster valve 103.

A hydraulic pressure delivered by the fluid pump 101 is applied through passage 125 between differential area lands 301 and 302 to effect leftward displacement of the valve spool 300 against the biasing force of the spring 308. When the hydraulic pressure is high enough the spool 310 displaces leftward, thus uncovers a port 316 communicating through passage 141 to the torque converter 3. Further displacement of the spool 300 uncovers an exhaust port 315 which has been registering to land 307, thus a portion of fluid is exhausted. As the quantity of fluid flowing through the ports 315 and 316 is increased, hydraulic pressure through passage 125 is decreased so that the spool 300 displaces rightward to effect decreasing the areas of ports 315 and 316 thus in turn increases the hydraulic pressure. Thus, an equilibrium is attained between hydraulic forces acting to the spool 300 and the force exerted by the spring 308, so that a line pressure is attained in the passage 125 applied to the differential area lands 301 and 302 includes an orifice 314 to stabilize line pressure to minor differences of the hydraulic pressure delivered by the pump 101.

The line pressure booster valve 103 urges the spool 300 by a rod 309 of the spool 310 when hydraulic pressure is applied to left end surface of land 312 or between differential area lands 311 and 312, so that line pressure increases to attain equilibrium to the force. When hydraulic pressure is applied to right end surface of the spool 300 to urge the spool leftward, the line pressure decreases to attain equilibrium.

The line pressure cut down valve 200, according to one embodiment of present invention, comprises a spool 201 and a spring 202 biasing the spool 201 rightward. Governor pressure through passage 130 is applied to right end surface of land 203 of spool 201 to urge the spool 201 leftward against the spring force. The passage 140 communicating to right end surface of the regulator valve 102 is connected to the cut down valve 200, and in the illustrated position of the spool 201 is communicated to an exhaust port 206; the passage 140 is mentioned as second passage. A port 207 registering a land 205 of the spool 201 is communicated to throttle pressure through passage 131; the passage 131 is mentioned as first passage. Lands 203 and 205 have same diameter, but to include hysteresis, land 205 may be slightly larger than the land 203.

As the governor pressure through passage 130 increases, the force applied to right end surface of the land 203 exceeds biasing force of the spring 202 to effect the spool 201 displacing leftward, so that exhaust port 206 is covered by land 203 and the port 207 is uncovered by land 205. Thus, throttle pressure through the first passage 131 is applied through groove 204 of the spool 201 to the second passage 140. Thus, right end surface of the regulator valve 102 which has been registering to exhaust port 206 is communicated to throttle pressure, so that the line pressure decreases stepwise when the vehicle speed exceeds a predetermined value. In this case, same throttle pressure is applied to the regulator valve 102 and 103, to both end surfaces of land 301 and 302. However, land 312 has larger diameter than the land 301, so that the modulated line pressure too, increases as the throttle pressure increases.

According to a feature of the present invention, throttle pressure is applied to the left end surface of land 312 of the line pressure regulator valve assembly to increase line pressure, and the line pressure cut down valve 200 is communicated to the right end surface of the regulator valve assembly to apply throttle pressure when the governor pressure exceeds a predetermined value. According to the present invention, the line pressure increases as the engine torque increases, and the line pressure decreases stepwise when the vehicle speed exceeds a predetermined value, so that proper capacities of the friction elements relative to the vehicle speeds are obtained.

FIG. 6 is a chart showing relations between the cut-down pressure through the second passage 140 and the governor pressure through the passage 130 relative to three throttle pressures. FIG. 7 is a chart showing line pressure relative to the vehicle speeds and the throttle pressure.

FIG. 8 shows another embodiment of the line pressure cut down valve 200'. The hydraulic control system shown in FIG. 8 is constructed for convenience of understanding all the same as shown in FIG. 3 except the modified cut down valve and related hydraulic circuit, and adapted to control the transmission mechanism shown in FIG. 1, further, same reference numerals are used to show similar parts, so that no detailed description will be repeated.

The line pressure cut down valve 200' shown in FIG. 8 according to the other feature of the present invention comprises a valve spool 201' and a spring 202' to bias the spool 201' rightward. Also, governor pressure through passage 130 is supplied to right end surface of a land 203' of the spool 201' to urge the spool leftward against the force of the spring 202'. The passage 140 communicating to right end surface of the regulator valve 102 is also connected to the cut down valve 200' and in the illustrated position of the spool 201' the passage 140 is communicated through a groove 204' to an exhaust port 206'; the passage 140 is mentioned as second passage. In this embodiment, ports 207' and 208' of the valve 200' are communicated to throttle pressure through the passage 131; the passage 131 is mentioned as first passage. As before, land 203 and 205 have same diameter; however land 205 may be slightly larger than the land 203 to include hysteresis.

As the governor pressure through passage 130 increases, the force applied to right end surface of the land 203' exceeds biasing force of the spring 202' and the force exerted by throttle pressure which is applied to left end surface of the land 205' to effect leftward displacement of the spool 201', so that exhaust port 206' is covered by land 203' and the port 207' is uncovered by land 205'. Thus throttle pressure through the first passage 131 is applied through groove 204' to the second passage 140.

Thus, right end surface of the regulator valve 102 which have been registering exhaust port 206' is communicated to throttle pressure through passage 131, so that the line pressure decreases stepwise when the vehicle speed exceeds a value which is determined by throttle pressure and increases as the throttle pressure increases.

According to the feature of the present invention, the line pressure increases as the engine torque increases, and the line pressure decreases stepwise when the vehicle speed exceeds a value. The vehicle speed to cause said stepwise decrease increases as the engine torque is increased, so that proper capacities of the friction element determined by the vehicle speeds, and engine loads are obtained by the cut down valve 201'.

FIG. 9 is an exemplified chart showing cut down pressure through the second passage 140 in relation to the governor pressure through the passage 130 and the throttle pressure through the passage 131. FIG. 10 is a chart showing line pressure relative to the vehicle speeds and the throttle pressures.

As shown in FIGS. 9 and 10, the line pressure cut down valve 200' has a function to compare governor pressure to throttle pressure, and delivers the throttle pressure to the right end surface of the line pressure regulator valve when the governor pressure is increased to a value determined by the throttle pressure, so that the line pressure is reduced stepwise. The stepwise reducing point of the line pressure increases as the engine load increases, compared to substantially constant value as shown in FIG. 7, of the first embodiment, thus more practical engaging capacities of the friction elements are obtained.

FIG. 11 shows a variation of the line pressure cut down valve 200' having same features. The line pressure cut down valve 210 comprises a valve spool 211 and a spring 212 biasing the spool 211 rightward.

Governor pressure through passage 130 is applied to the right end surface of the spool 211 as before, to urge the spool 211 leftward. Throttle pressure through passage 131 is applied to area difference between lands 215 and 216 in this case, to urge the spool 211 rightward as before. When governor pressure applied to right end surface of the spool 211 exceeds the spring force and the throttle force determined by the area difference between lands 215 and 216, the spool 211 displaces leftward to communicate passages 131 and 140, blocking the communication between passage 140 and exhaust port. In this case, as the area of the lands 213 and 215 is substantially the same, the urging force by throttle pressure is modified by the area difference between lands 215 and 216, so that the stepwise reducing point shown in FIG. 10 displaces somewhat leftward. However, similar effect is attained that line pressure is reduced stepwise as the vehicle speed increases and the reducing point increases as the engine torque increases.

As another modification of the line pressure cut down valve, the spring 202' or 212 may be omitted to effect similar stepwise reduction of line pressure, in relation to governor pressure or the vehicle speed and throttle pressure or the engine torque.

It will be appreciated that by combining a simple line pressure cut down valve to hydraulic control system according to the invention, line pressure produced by the fluid source increases as the driving engine torque increases, and decrease stepwise as the vehicle speed increases to a predetermined value or increasing value as the engine torque increases, so that the line pressure or hydraulic pressure operating the friction elements of automatic transmission mechanism is controlled to accommodate necessary capacity of the friction elements.

While the illustrated transmission mechanism and the hydraulic control system is used as an example to illustrate the invention, it will be understood that the invention has application to any transmission and hydraulic control systems utilizing hydraulic pressure to effect engagement of friction elements to attain automatic shifting between speed ranges.

What is claimed is:
1. In a hydraulic control system for automatic transmission mechanism having an input and an output shaft, at least one planetary gear unit disposed between said shafts, and a plurality of friction elements including at least one friction clutch and/or friction brake, to effect a plurality of forward gear ratios and at least one reverse gear ratio by selectively hydraulically engaging or disengaging said friction elements, said control system comprises, a hydraulic pressure source, a line pressure regulator valve controlling hydraulic pressure produced by said source, a plurality of fluid chambers to operate said friction elements by introducing the line pressure controlled by operation of said regulator valve, governor valve means producing governor pressure representing the vehicle speed, a throttle valve producing throttle pressure representing the engine torque, a first passage to introduce said throttle pressure to said line pressure regulator valve to increase said line pressure, a second passage to introduce said throttle pressure to said line pressure regulator valve to reduce said line pressure, a line pressure cut down valve disposed between said first and second passages to exhaust said second passage when said governor pressure is smaller than a predetermined value and to communicate said second passage to said first passage when the governor pressure is larger than said predetermined value, so that the line pressure increases as the engine torque increases, and is reduced stepwise as the vehicle speed increases to a predetermined value.

2. In a hydraulic control system for automatic tranmission mechanism having an input and an output shaft, at least one planetary gear unit disposed between said shafts, and a plurality of friction elements including at least one friction clutch and/or friction brake, to effect a plurality of forward gear ratios and at least one reverse gear ratio by selectively hydraulically engaging or disengaging said friction elements, said control system comprises, a hydraulic pressure source, a line pressure regulator valve controlling hydraulic pressure produced by said source, a plurality of fluid chambers to operate said friction elements by introducing the line pressure controlled by operation of said regulator valve, governor valve means producing governor pressure representing the vehicle speed, a throttle valve producing throttle pressure representing the engine torque, a first passage to introduce said throttle pressure to said line pressure regulator valve to increase said line pressure, a second passage to introduce said throttle pressure to said line pressure regulator valve to reduce said line pressure, a line pressure cut down valve disposed between said first and second passages to exhaust said second passage when said governor pressure is smaller than a value determined by the throttle pressure and to communicate said second passage to said first passage when the governor pressure exceeds said value, so that the line pressure increases as the engine torque increases, and is reduced stepwise as the vehicle speed increases to a value determined by the driving engine torque.

References Cited
UNITED STATES PATENTS

| | | | |
|---|---|---|---|
| 3,285,387 | 1/1967 | Leonard et al. | 74—869 X |
| 3,336,815 | 8/1967 | Leonard | 74—869 X |
| 3,387,508 | 6/1968 | Searles et al. | 74—867 X |
| 3,393,585 | 7/1968 | Pierce | 74—869 X |

ARTHUR T. McKEON, *Primary Examiner.*

U.S. Cl. X.R.

74—869